(12) United States Patent
Jia et al.

(10) Patent No.: US 11,039,015 B2
(45) Date of Patent: Jun. 15, 2021

(54) METHOD AND SYSTEM FOR FACILITATING HIGH-FIDELITY AUDIO SHARING

(71) Applicant: Zoom Video Communications, inc., San Jose, CA (US)

(72) Inventors: Zhaofeng Jia, Cupertino, CA (US); Huipin Zhang, Palo Alto, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 16/824,642

(22) Filed: Mar. 19, 2020

(65) Prior Publication Data

US 2020/0304644 A1 Sep. 24, 2020

Related U.S. Application Data

(60) Provisional application No. 62/821,339, filed on Mar. 20, 2019.

(51) Int. Cl.
| | |
|---|---|
| *H04M 3/56* | (2006.01) |
| *H04N 7/14* | (2006.01) |
| *H04N 7/15* | (2006.01) |
| *H04R 5/04* | (2006.01) |

(52) U.S. Cl.
CPC ............ *H04M 3/568* (2013.01); *H04N 7/147* (2013.01); *H04N 7/152* (2013.01); *H04R 5/04* (2013.01)

(58) Field of Classification Search
CPC ....... H04M 3/568; H04N 7/147; H04N 7/152; H04R 5/04; G06F 3/16; G06F 3/167
See application file for complete search history.

(56) References Cited

U.S. PATENT DOCUMENTS

| | | | | |
|---|---|---|---|---|
| 7,747,002 B1* | 6/2010 | Thi | ........................ | H04M 7/129 379/406.08 |
| 2009/0252316 A1* | 10/2009 | Ratmanski | .............. | H04M 3/56 379/202.01 |
| 2013/0002797 A1* | 1/2013 | Thapa | ................... | H04M 3/002 348/14.01 |
| 2014/0003635 A1* | 1/2014 | Mohammad | ........... | G10K 11/16 381/306 |
| 2015/0249885 A1* | 9/2015 | Kawabata | .............. | H04B 3/231 381/66 |

\* cited by examiner

*Primary Examiner* — Fan S Tsang
*Assistant Examiner* — David Siegel
(74) *Attorney, Agent, or Firm* — James M. Wu; JW Law Group (57) ABSTRACT

An apparatus and/or method discloses a video conference with enhanced audio quality using high-fidelity audio sharing ("HAS"). In one embodiment, a network connection between a first user equipment ("UE") and a second UE is established via a communication network for providing an interactive real-time meeting. After sending a first calibration audio signal from the first UE to the second UE, a second calibration audio signal is retuned from the second UE to the first UE according to the first calibration audio signal. Upon identifying a far end audio ("FEA") delay based on the first calibration audio signal and the second calibration audio signal, a first mixed audio data containing the first shared audio data and first FEA data is fetched from an audio buffer. The first FEA data is subsequently removed or extracted from the mixed audio data in response to the FEA delay.

21 Claims, 9 Drawing Sheets

METHOD AND SYSTEM FOR FACILITATING HIGH-FIDELITY AUDIO SHARING

PRIORITY

This application claims the benefit of priority based upon U.S. Provisional Patent Application Ser. No. 62/821,339, filed on Mar. 20, 2019 in the name of the same inventor and entitled "Method and System for High Fidelity Audio Sharing," the disclosure of which is hereby incorporated into the present application by reference.

FIELD

The exemplary embodiment(s) of the present invention relates to the field of network communication. More specifically, the exemplary embodiment(s) of the present invention relates to provide a video conference meeting.

BACKGROUND

With increasing popularity of digital electronics and network communication, real-time interactive video conferences become ever more popular. For example, video conferencing applications allow people to communicate with each other in remote locations through audio and video media in real time. In some instances, there is a desire to present visual content as well as audio sharing to other attendees of the video conference.

Audio sharing during a video conference is an important feature for an online meeting. A meeting attendee, for example, can shared sound, music, play, voice, with other attendees by playing the shared sound from his/her client system with almost instantaneous sound effect. A problem, however, associated with an audio quality is that it is often difficult to distinguish and remove certain unintended noise, such as echo, conversation, background music, owner voice, from the shared audio.

SUMMARY

On embodiment of the present invention discloses a real-time video conference with enhanced audio quality using high-fidelity audio sharing ("HAS") approach. In one embodiment, the HAS process capable of facilitating a video conference with improved audio quality establishes a network connection between a first user equipment ("UE") and a second UE via a communication network for providing an interactive real-time meeting. After sending a first calibration audio signal from the first UE to the second UE, a second calibration audio signal is retuned from the second UE to the first UE according to the first calibration audio signal. Upon identifying a far end audio ("FEA") delay based on the first calibration audio signal and the second calibration audio signal, a first mixed audio data containing the first shared audio data and first FEA data is fetched from an audio buffer. The first FEA data is subsequently removed or extracted from the mixed audio data in response to the FEA delay.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Embodiments of the present invention disclose a method (s) and/or apparatus for providing an online real-time interactive conference meeting with multiple attendees using high quality sound effect.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiment(s) of present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device, such as, but not limited to, magnetoresistive random access memory ("MRAM"), phase-change memory, or ferroelectric RAM ("FeRAM"), flash memory, ROM (Read Only Memory), PROM (Programmable Read Only Memory), EEPROM (Electrically Erasable Programmable Read Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

On embodiment of the present invention discloses a real-time video conference with enhanced audio quality using high-fidelity audio sharing ("HAS") approach. In one embodiment, the HAS process capable of facilitating a video conference with improved audio quality establishes a network connection between a first user equipment ("UE") and a second UE via a communication network for providing an interactive real-time meeting. After sending a first calibration audio signal from the first UE to the second UE, a second calibration audio signal is retuned from the second UE to the first UE according to the first calibration audio signal. Upon identifying a far end audio ("FEA") delay based on the first calibration audio signal and the second calibration audio signal, a first mixed audio data containing the first shared audio data and first FEA data is fetched from an audio buffer. The first FEA data is subsequently removed or extracted from the mixed audio data in response to the FEA delay.

Figure 1:
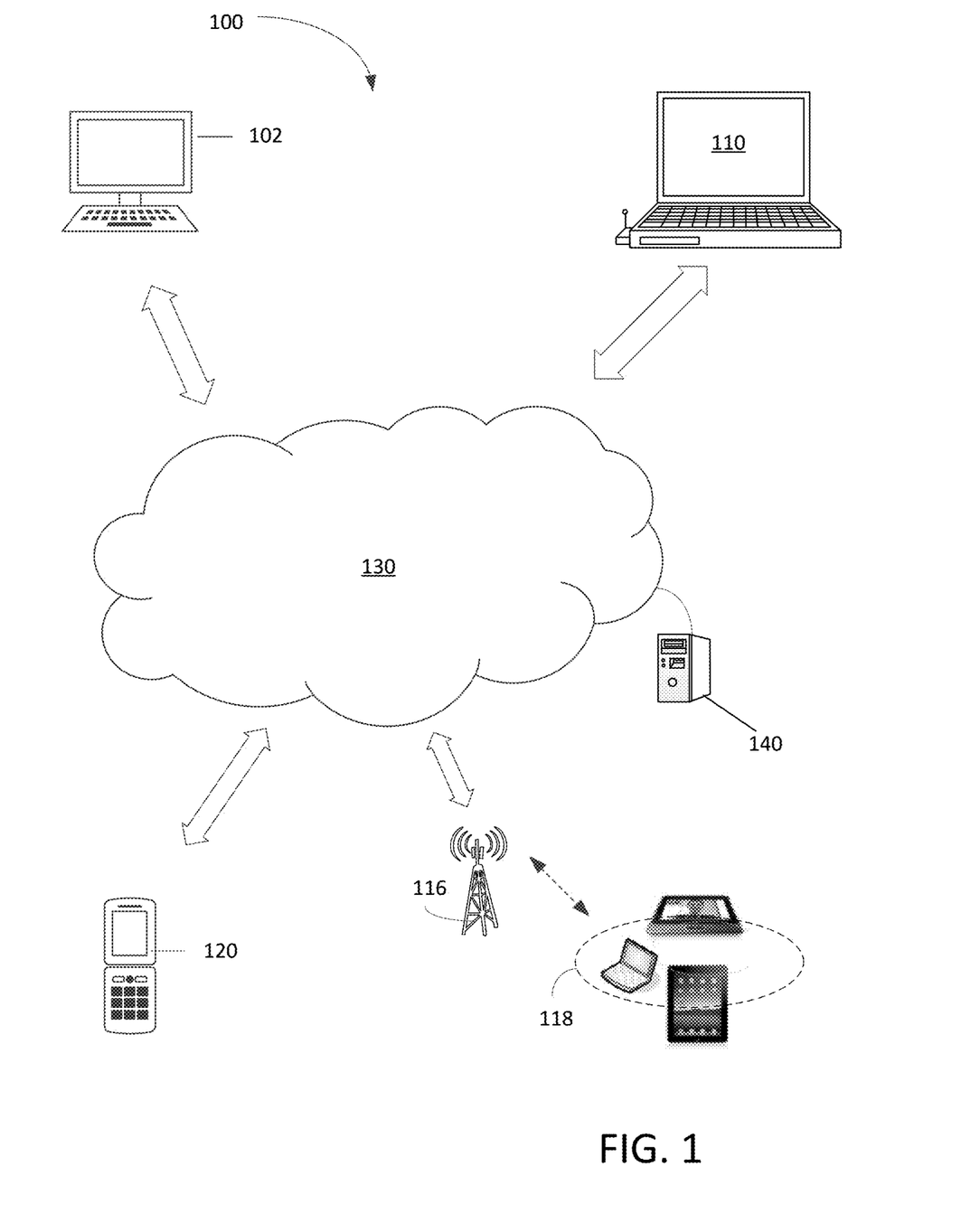
FIG. 1 is a block diagram illustrating a communication network capable of facilitating one or more interactive real-time video conferences with high-fidelity audio sharing ("HAS") in accordance with one embodiment of the present invention.

FIG. 1 is a block diagram 100 illustrating a communication network capable of facilitating one or more interactive real-time video conferences with HAS in accordance with one embodiment of the present invention. In one approach, a server computer 140 is coupled to a network 130, which is also coupled to client computers 102, 110, and 120 as attendee's systems or devices. Server 140, in one example, is further coupled to a group of wireless or portable devices 118 via a base station 116. In one example, server 140 may represent an instance among a large instances of application server in a data center, cloud computing environment, or any other mass computing environment. There also may include thousands or millions of client computers. It should be noted that the underlying concept of the exemplary embodiment(s) of the present invention would not change if one or more blocks (or systems) were added to or removed from diagram 100.

In an embodiment, server computer 140 hosts a video conferencing meeting and transmits and receives video, image, and audio data to and from each of the client computers 102, 110, 118, 120. Each of the client computers 102, 110, 118, 120 includes a computing device having a central processing unit (CPU), graphics processing unit (GPU), one or more buses, memory organized as volatile and/or nonvolatile storage, one or more data input devices, I/O interfaces and output devices such as loudspeakers or a LINE-OUT jack and associated drivers. Each of the client computers 102, 110, 118, 120 may include an integrated or separate display unit such as a computer screen, TV screen or other display. Client computers 102, 110, 118, 120 may comprise any of mobile or stationary computers including desktop computers, laptops, netbooks, ultrabooks, tablet computers, smartphones, et cetera. It should be noted that GPU and CPU each manage separate hardware memory spaces. For example, CPU memory may be used primarily for storing program instructions and data associated with application programs, whereas GPU memory may have a high-speed bus connection to the GPU and may be directly mapped to row/column drivers or driver circuits associated with a liquid crystal display (LCD) that serves as the display. In one embodiment, the network 130 is the Internet.

Each of the client computers 102, 110, 118,120 hosts, in an embodiment, an application that allows each of the client computers 102, 110, 118, 120 to communicate with the server computer 140. In an embodiment, the server 140 may maintain a list of accounts, each associated with one of the client computers 102, 110, 118, 120 and/or one or more users of the client computers.

In one embodiment, each of the client computers 102, 110, 118, and 120 can be used by an attendee of a video conference session using HAS operations. Client computers 102, 110, 118, and 120 can be simultaneously a presenter and recipient attendee of a video conference session.

An advantage of employing HAS is that the HAS operation provides an improved or enhanced sound effect including playing video clips, movies, YouTubes, and the like.

Figure 2:
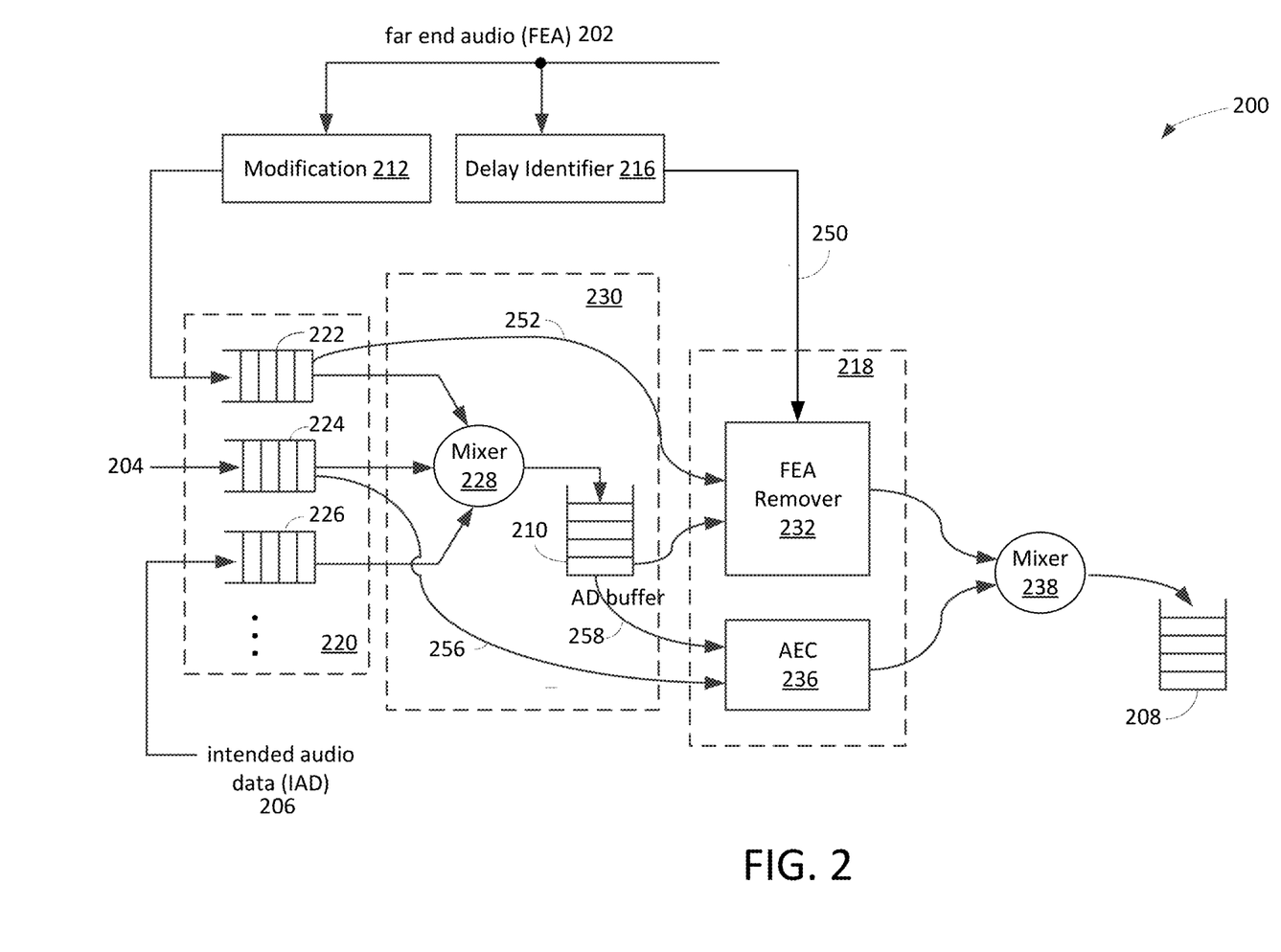
FIG. 2 is a logic block diagram illustrating a process of providing HAS during a video conference in accordance with one embodiment of the present invention.

FIG. 2 is a logic block diagram 200 illustrating a process of providing HAS during a video conference session in accordance with one embodiment of the present invention. Diagram 200 includes FEA data or packet stream 202, buffers 220, audio data ("AD") block 230, and a signal remover block 218. Diagram 200, in one embodiment, further includes an output or shared data buffer 208 and a stream of shared data or packet streams 206 for intended audio data ("IAD") to be shared with the attendees. It should be noted that the underlying concept of the exemplary embodiment(s) of the present invention would not change if one or more blocks (or components) were added to or removed from diagram 200.

Buffer 220 includes an FEA buffer 222, IAD buffer 226, and voice buffer 224. FEA buffer 222, in one embodiment, is used to buffer or store FEA data 202. IAD buffer 226, in one aspect, is used to store IAD 206 which is intended to forward to other attendees for audio sharing. Voice buffer 224, in one example, buffers other unintended audio signals such as audio sound captured by a microphone. In other examples, voice buffer 224 can also be considered as a microphone buffer or echo buffer.

AD block 230 includes a mixer 228 and an AD buffer 210. In one aspect, mixer 228 is used to merge various received audio signals or data, such as, but not limited to, IAD from IAD buffer 226, FEA data from FEA buffer 222, and echo signals from buffer 224, for audio sharing. Upon mixing or combing various audio signals or data, the mixed AD is stored or pushed onto AD buffer 210.

To handling FEA data 202, diagram 200 further includes an FEA modification module 212 and FEA delay identifier 216. FEA modification module 212 is used to modify FEA signal to incorporate and/or compensate signal alteration due to filtration, such as energy attenuation or boost caused by linear or nonlinear filtration. Delay identifier 216, in one aspect, is used to calibrate a delay associated with FEA with respect to IAD 206.

Signal remover block 218, in one embodiment, includes an FEA remover 232 and an AEC component 236. FEA remover 232 receives input from FEA buffer 222 as indicated by numeral 252 and AD from AD buffer 210. FEA remover 232, in one embodiment, is configured to extract or remove FEA data from the AD in accordance with the FEA delay as indicated by numeral 250. AEC component 236, in one embodiment, is a device similar to acoustic echo cancellation device capable of removing or extracting echo related audio signals from AD. In one embodiment, AEC component 236 receives AD from AD buffer 210 as indicated by numeral 258 and unintended voice or sound for sharing from buffer 204 as indicated by numeral 256. The outputs of FEA remover 232 and AEC component 236 are merged by mixer 238 before storing the shared data into shared data buffer 208.

It should be noted that HAS is an important and fundamental requirement for an online meeting. The HAS operation extracts the shared audio from a speaker audio buffer or AD buffer 210 which may mix FEA data or information from a remote meeting attendee. One embodiment of HAS operation involves in finding the delay between the original FEA signal and the signal mixed into the signal to be shared. After subtracting the FEA signal from the mixed signal fetched from the speaker audio buffer, the shared audio is obtained and subsequently forwarded to the attendees.

The delay, in one example, can be obtained by minimizing the sum-of-absolute-difference ("SAD") between the source signal and the mixed signal. It should be noted that the SAD algorithm is applicable to both time domain as well as frequency domain. The accuracy of the delay may be at the sample level (time-domain) or at the frame level (frequency domain) whereby for a 48 kHz signal, the delay should be within $1/48$ millisecond.

An advantage of employing HAS is that it helps to achieve high-fidelity audio sharing for the shared audio which improves sound effect such as music or voice signals.

Figure 3:
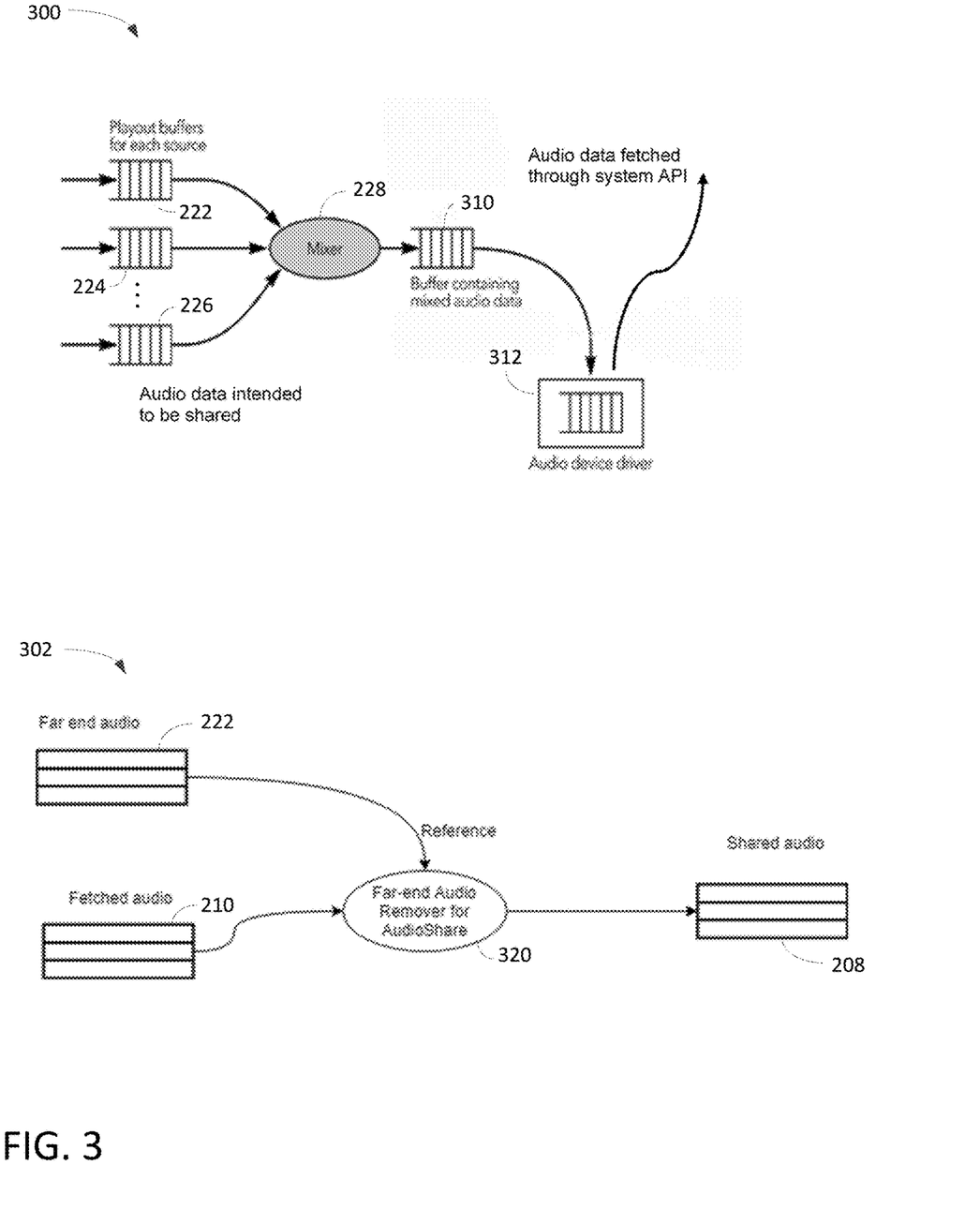
FIG. 3 illustrates block diagrams showing a process of providing shared audio data in accordance with fetched audio data and far end audio ("FEA") data in accordance with one embodiment of the present invention.

FIG. 3 illustrates block diagrams 300-302 showing a process of providing shared audio data in accordance with fetched audio data and far end audio ("FEA") data in accordance with one embodiment of the present invention. Diagram 300 includes buffers 222-226, mixer 228, buffer 310, and audio device driver 312. In one aspect, buffer 310 is the same or similar to AD buffer 210 shown in FIG. 2. It should be noted that the underlying concept of the exemplary embodiment(s) of the present invention would not change if one or more blocks (or devices) were added to or removed from FIG. 3.

To provide a real-time interactive video conference, audio sharing is an important feature for facilitating an effective meeting. HAS, in one embodiment, can facilitate improved audio quality for the meeting attendees. For example, sharing sound, music, and/or voice from a host computer/mobile device to attendees via attendees' system without delivery unintended FEA can be achieved via HAS process. HAS, for example, allows all attendees to hear the same sound at the same or substantially the same time while minimizing unintended FEA signals.

It should be noted that sound to be shared is generally hidden by the Operating System (OS) of a client computer or device. On the application layer, the meeting client generally cannot have direct access to audio data to be shared. For example, if a song from a Youtube video is intended to be shared, the video can be played on a browser or Youtube App. The browser or the App uses OS system layer API (Application Programming Interface) to instruct the speaker(s) to play the audio while various other applications generally do not know the actual audio data.

During an operation of a video conference, a meeting client who tries to share audio can fetch AD from an audio device driver 312 through OS APIs. The fetched AD, however, may not be the same as the audio data that is intended to be shared. Referring back to diagram 300, the fetched AD, in one example, may be mixed with audio data from other applications, such as, but not limited to, audio from another Youtube video which is being played out, a song being played out in an audio player, and so on.

In an online meeting scenario, a remote meeting attendee, for example, may converse with other meeting attendees during an audio sharing session thereby such audio data from the remote meeting attendee may also need to be played out in the local speaker. As such, the fetched audio data is likely to contain both the audio data being shared and the voice data from the remote speaker which is also known as FEA. Upon modifying by mixer 228, the FEA mixed into the shared audio is not precisely identical to the original signal. The mixed AD, in one example, includes a delayed copy of the original and sometimes it is a filtered version of the original where the filter is applied for audio equalization. It should be noted that the filter modifies audio signal overall energy and/or energies of frequency components.

In one embodiment, HAS is configured to remove the far end speaker audio from the fetched audio data, as the first step toward achieving high fidelity audio sharing. Diagram 302 illustrates a process that fetched audio from fetched audio buffer 210 and the FEA fetched from FEA buffer 222 are input signals to an FEA remover 320 for outputting shared audio to shared audio buffer 208. In one embodiment, the FEA signal is used as a reference in the process since the version of the signal mixed into the fetched audio is closely related to the original FEA.

An advantage of using HAS is to extract or minimize unintended FEA signals before sending the shared audio rather than the traditional way of stop playing FEA manually to minimize the audio data from other applications.

Figure 4:
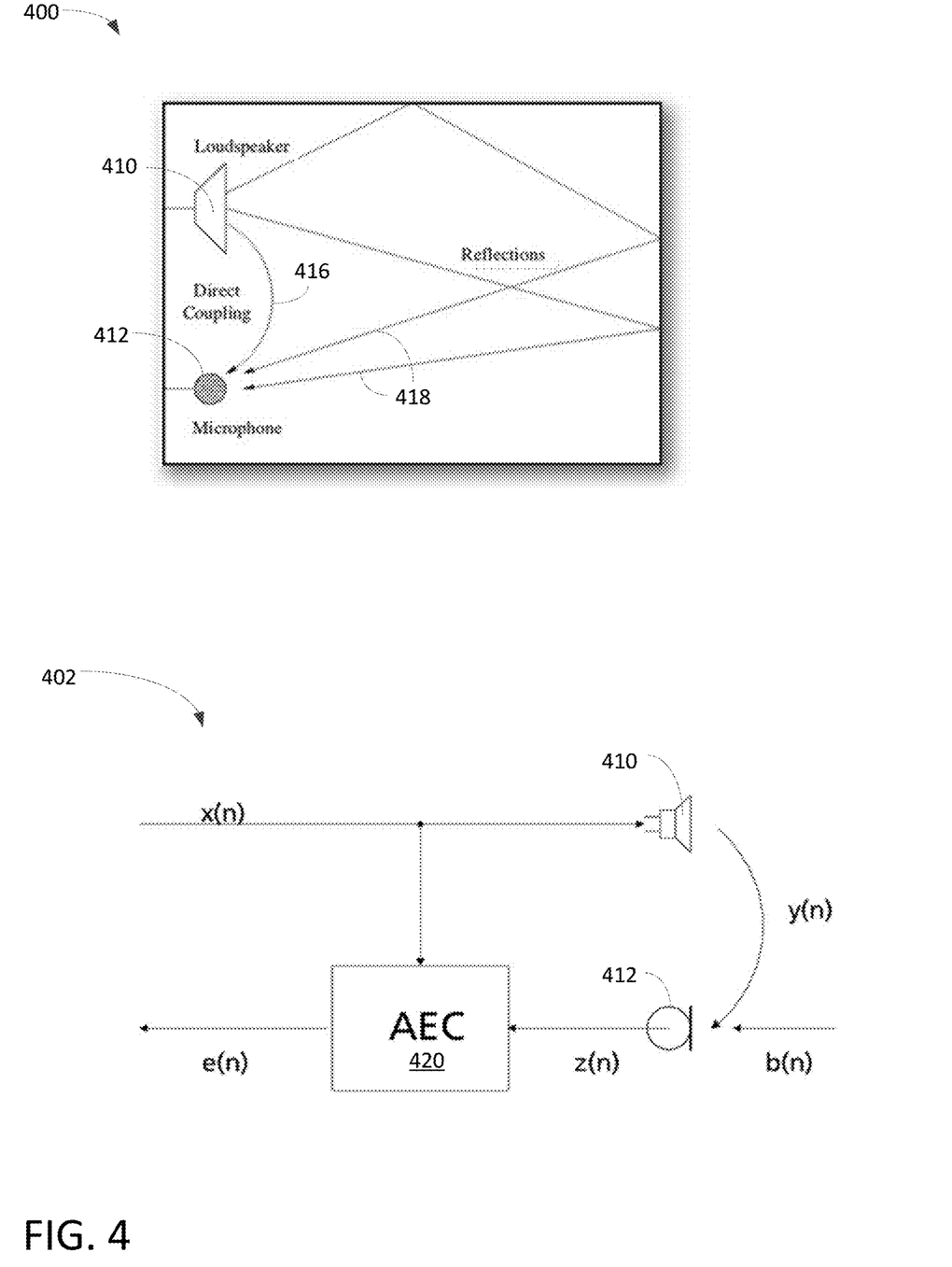
FIG. 4 illustrates block diagrams showing a process of removing unintended sound signals in accordance with one embodiment of the present invention.

FIG. 4 illustrates block diagrams 400-402 showing a process of removing unintended sound signals in accordance with one embodiment of the present invention. Diagram 400 illustrates a scenario in which a microphone 412 receives sound or audio signals from a speaker or loudspeaker 410. The sound includes direct coupling 416 and reflections as indicated by numeral 418. Diagram 402 is similar to diagram 400 except that an AEC component 420 is added. It should be noted that the underlying concept of the exemplary embodiment(s) of the present invention would not change if one or more blocks (or components) were added to or removed from diagrams 400-402.

In one aspect, a method of deploying an Acoustic Echo Cancellation (AEC) to cancel out the remote speaker audio or FEA which can be considered as an acoustic echo signal. A function of AEC is to cancel acoustic echo due to acoustic reverberation in an acoustic environment. Diagram 400 illustrates audio signals captured by microphone 412 including direct coupling signal 416 from loudspeaker 410 combining with multiple reflection/echo signals 418. Echo signal 418 may be a combination of multiple versions of the original signal with modification due to the reflections in the environment. The modification involves delay in time, signal energy attenuation, and even frequency addition/elimination.

Diagram 402 illustrates an embodiment of HAS using AEC component 420 to remove certain types of unintended audio signals. The far end signal x(n) is played out by loudspeaker 410 and the audio signal z(n) captured by microphone 412 which is a near end signal b(n) combined with y(n). The played out far end signal together with the echo signals can be generated in an enclosed environment, which can be expressed in the following equation:

$$z(n)=y(n)+b(n)$$

AEC takes z(n) as input signal and cancels out echo to produce an approximation of the near end signal b(n), which can be expressed in the following equation, $$e(n) \approx b(n).$$

Note that the original far end signal x(n) is an important reference signal to cancel the echo. Conceptually, e(n) may be written as $$e(n)=z(n)-f(x(n)), \quad (1)$$

where f(.) represents a complex process mainly including Adaptive Linear Filter (ALF) and Non-Linear Processing (NLP). ALF, in one example, removes a filtered version x(n) from z(n) in an optimal way and NLP removes the non-linear echo components. AEC, in one aspect, can be expensive in consumption of resources since the linear filter can be long in tap and adaptively updated as often as one hundred times every second.

Figure 5:
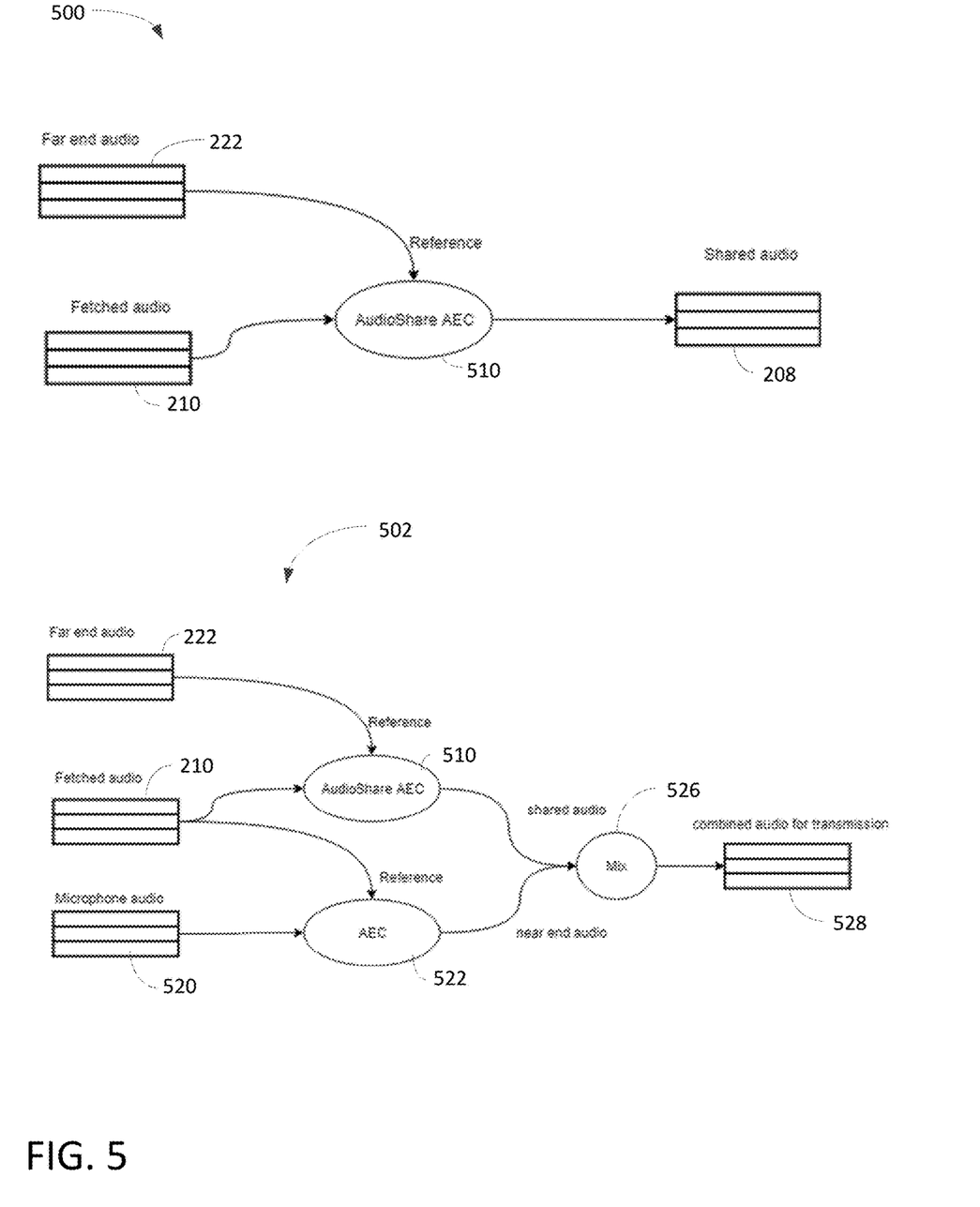
FIG. 5 illustrates embodiments of HAS process capable of providing shared audio data in accordance with one embodiment of the present invention.

FIG. 5 illustrates embodiments of HAS process capable of providing shared audio data in accordance with one embodiment of the present invention. Diagram 500 is similar to diagram 302 shown in FIG. 3 except that AEC is used for removing FEA. Diagram 500 illustrates a process that fetched audio from fetched audio buffer 210 and FEA fetched from FEA buffer 222 are input signals to an audio share AEC 510 for outputting shared audio to shared audio buffer 208. Diagram 502 is similar to diagram 500 except that additional AEC component 522 and mixer 526 are added. It should be noted that the underlying concept of the exemplary embodiment(s) of the present invention would not change if one or more blocks (or devices) were added to or removed from diagrams 500-502.

Diagram 500 illustrates a process of deploying AEC for removing FEA using AudioShare AEC 510 which, as a core module, takes the fetched audio signal from the speaker buffer 210 as the input and uses the FEA signal as a reference to generate the shared audio. The shared audio is subsequently stored in shared audio buffer 208. It should be noted that using AEC 510 can be effective if the FEA mixed into the fetched audio is similar to acoustic echo. Although ALF and NLP may distort the shared audio signal such as music signals, AEC 510 generally performs well.

Diagram 502 illustrates an embodiment of HAS which can be used in an audio sharing session in which an attendee who wants to share audio may also involve in an active voice conversation. In this situation, the audio data sent from a meeting attendee includes both the near end signal from the microphone and the shared audio signal. Diagram 502 shows the combined process in which audioshare AEC 510 removes the FEA from the fetched audio and AEC component 522 cancels or removes acoustic echo. In such an audio sharing system, two AEC modules 510 and 522 are adopted. Depending on applications, employing both audio share ACE 510 and AEC component 522 can increase computation complexity which can affect overall audio experience.

Figure 6:
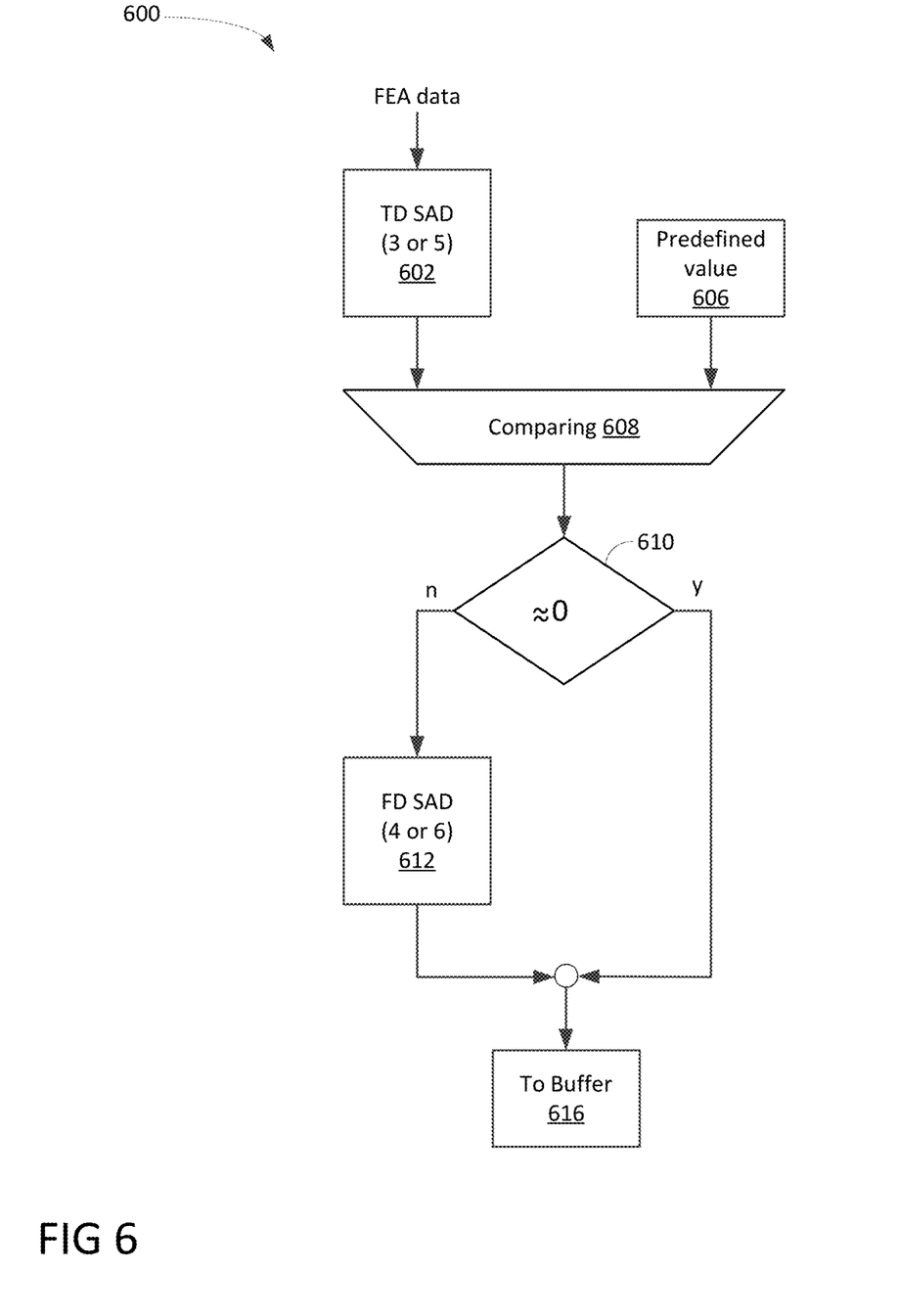
FIG. 6 is a logic diagram illustrating a process of modifying FEA to compensate attenuation and/or boost in accordance with one embodiment of the present invention.

FIG. 6 is a logic diagram 600 illustrating a process of modifying FEA to compensate attenuation and/or boost in accordance with one embodiment of the present invention. Diagram 600 illustrates a time-domain SAD 602 and a frequency-domain SAD 612 for identifying modified versions of FEA. It should be noted that the underlying concept of the exemplary embodiment(s) of the present invention would not change if one or more blocks (or components) were added to or removed from diagram 600.

Diagram 600 illustrates a logic flow of FEA modification in which TD SAD 602 produces a TD result based on FEA data as input data. After comparing 608 with a predefined value 606, the process determines whether a zero or near zero is identified at step 610. If the near zero or zero is identified, the process proceeds to step 616 and modified FEA is found and stored in a buffer. If the near zero is not found, FD SAD 612 is used to determine the modified FEA, and subsequently proceeds to step 616 to stored the modified FEA in a buffer.

As shown early, fetched audio from the speaker buffer includes mixing FEA and audio to be shared. It should be noted that the version of FEA signal in the mixer may not be the same as the original. The following scenarios may be reasons why they are different:

R1: the far end audio signal is delayed,
R2: the far end audio signal is modified by the speaker equalizer, i.e., the signal is filtered by a linear or nonlinear filter with possible energy attenuation, and/or
R3: the overall energy of the far end audio signal is attenuated or boosted.

Denote by f(.) the above modification(s) to the original far end signal, and x(n) the original far end audio signal, by z(n) the fetched audio signal shown in FIG. 4. The shared audio signal is obtained by removing the modified FEA signal from the fetched audio signal, which can be expressed in the following expression:

$$e(n)=z(n)-f(x(n)), \quad (2)$$

where f is yet to be found.

An optimal f may be found by formulating an optimization problem as follows $$e(n)=\min\_over\_t \| z(n)-x(n+t) \|, \quad (3)$$

where $\|v\|$ stands for a norm measuring the energy of vector v. In the simplest way, $\|v\|$ is the L1 norm which is defined as the absolute sum of the vector elements v(n), and $\|z(n)-x(n+t)\|$ is the so-called sum-of-absolute-difference (SAD) between the fetched audio signal and the far end audio signal with time shift by t.

By varying the shift tin a range such as [−T, T], where T is a preselected positive integer, the minimal SAD can be found at a specific time shift T0. T0 is the delay between the version of far end video mixed in the fetched audio signal and the original far end audio signal, and thus the shared audio signal can be obtained by the following expression:

$$e(n)=z(n)-x(n+T0).$$

The above formulation is effective, especially for case R1 above, i.e., the far end audio signal is delayed. Note that the accuracy of the delay T0 is at the sample level, so for a 48 kHz signal, the delay should be within 1/48 millisecond, and thus the invention helps to achieve very high-fidelity audio sharing, which is critical for music signals.

In case R2, where the far end audio signal is filtered by a linear or nonlinear filter with possible energy attenuation, formulation in (3) is not effective since modification is in the frequency domain. However, an optimization similar (3) is formulated as follows $$E(f)=\min\_over\_t\|Z(f)-X\_t(f)\|, \quad (4)$$

where E(f), Z(f), and X_t(f) are respectively the Discrete-Time Fourier Transform (DTFT) of the time-domain signal e(n), x(n) and x(n+t), and f represents the frequency index. Similarly, 2-dimensional SAD between the fetched audio signal and the far end audio signal with a time shift t may be calculated for a range of t in [−T, T] and the full frequency range. In other words, the 2-D SAD is actually applied in the spectrogram [3] of the two signals z(n) and x(n+t), where t represents frame index. If the optimal time shift T0, or delay, is found, then the shared audio signal in the frequency domain is obtained optimally $$E(f)=Z(f)-X\_T0(f).$$

Note that, depending on the frame size (e.g., s samples per frame), a change of t by 1 in the frequency formulation means a shift of s samples. Therefore, if the signal sampling rate is 48 kHz, delay T0 is at the granularity level of s*1/48 millisecond, which means that the delay accuracy is coarser than that found in the time domain.

To tackle case R3, i.e., the overall energy of the far end audio signal is attenuated or boosted, the above formulations may be slightly modified by introducing a scaling factor gamma, i.e., equation (3) becomes $$e(n)=\min\_over\_t\_and\_gamma\|z(n)-gamma*x(n+t)\|, \quad (5)$$

and equation (4) becomes $$E(f)=\min\_over\_t\_gamma\|Z(f)-gamma*X\_t(f)\|. \quad (6)$$

In a similar way, the optimal solution may be found by comparing the SADs for time shift t in a range [−T, T] and a prespecified list of gamma candidates [G0, G1, . . . , G_N]. Formulations (3), (4), (5) and (6) may be combined to take care of combinations of cases R1, R2 and R3. One way to combine the approaches is to solve (3) prior to (5), or similarly, (4) prior to (6). Since (3) is a simpler version of (5) (gamma=1), one can solve (3) and then compare the minimal SAD with a preselected threshold before solving (5). If the minimal SAD is smaller than the threshold, then an optimal solution is considered to have been found and solving (5) is not needed. Otherwise, the optimal solution for (5) is the final solution. A similar approach may be applied for formulations (4) and (6).

Another way to combine the approaches is based on the computation complexity. Since 2-dimensional SAD is more expensive to compute than 1-dimensional SAD, one can adaptive combines the time-domain solution and the frequency solution (3) and (4), or (5) and (6). If the time-domain minimal SAD is less than a preselected threshold, then the optimal solution is considered to have been found and thus the frequency-domain is skipped. Otherwise, the frequency-domain problem needs to be solved and the corresponding solution is the final solution.

One embodiment of HAS is capable of solving optimization problems (3), (4), (5) and (6) to obtain the delay T0 through searching for the minimal SAD between the fetched audio from the speaker buffer and the original far end audio. For example, the optimization problems are solved in the special case when the shared audio b(n) is zero, and the obtained delay T0 is applied throughout the whole process since T0 is usually constant or varies very slightly.

The delay estimation may be in the time domain, as formulated in (3) and (5), or in the frequency domain, as in (4) and (6). The approach in the frequency domain has an advantage over the one in the time domain, since if the speaker performs some filtering to modify the signal frequencies before playing the signal out, the time-domain SAD comparison may not be able to generate a result as accurate as from the frequency domain comparison. In other words, the frequency approach is more robust in generating good results than the time domain approach, however, it is also evident that the frequency domain approach is more computationally expensive.

One embodiment of HAS is to leverage the advantages of both the time domain approach and the frequency domain approach. One can combine the estimation in both time-domain and frequency-domain: if the minimal SAD is very small (or near zero) in the time domain, then this means the (near) perfect match is found, so the optimal delay is achieved. Otherwise, there may be some kind of filtering performed by the speaker, so the frequency domain may be further used to estimate the delay.

In one aspect, a method for facilitating an interactive video conference via multiple client devices which are coupled with a communication network is able to establish a conference meeting linking a first UE to a second UE via a communication network for attending the conference meeting. After obtaining FEA signal from the second UE to the first UE via the communication network, the first FEA is forwarded to a time domain modifier to generate a first modified FEA signal containing information relating to attenuation. Upon generating a minimal value of sum-of-absolute-difference in response to the first modified FEA signal, the second modified FEA signal is stored into a buffer location pointed by a first FEA delay. In one embodiment, the process is capable of forwarding the first modified FEA signal to a frequency domain modifier to generate a second modified FEA signal when the minimal value is greater than a predefined minimal number. In addition, after sending a first calibration audio signal from the first UE to the second UE, a second calibration audio signal is returned from the second UE to the first UE in accordance with the first calibration audio. In one example, the FEA delay can be identified based on the first calibration audio signal and the second calibration audio signal. Alternatively, upon fetching a first mixed audio data containing first shared audio data and first FEA data from a first location of an audio buffer, the process is capable of removing substantially the first FEA data from the mixed audio data in response to the first FEA delay.

Figure 7:
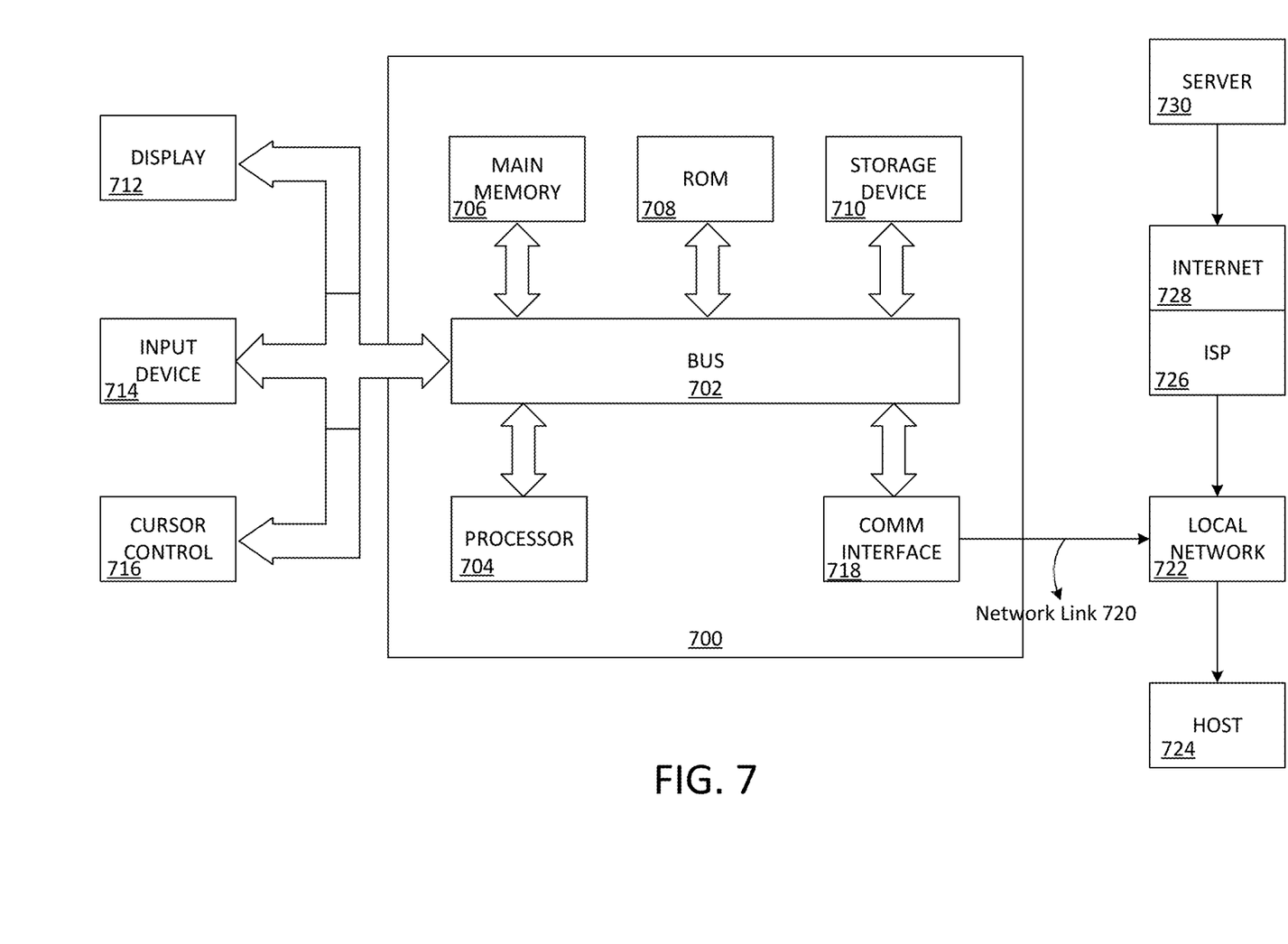
FIG. 7 is a block diagram illustrating a system or computer capable of participating a real-time interactive video conference with the capability of facilitating HAS in accordance with one embodiment of the present invention.

FIG. 7 is a block diagram illustrating a system or computer capable of participating a real-time interactive video conference with the capability of facilitating HAS in accordance with one embodiment of the present invention. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, a hard disk, a solid state drive, a magnetic tape, or any other magnetic data storage medium, a CD-ROM, any other optical data storage medium, any physical medium with patterns of holes, a RAM, a PROM, and an EPROM, a FLASH-EPROM, an NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or a solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on a storage device either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated service digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Figure 8:
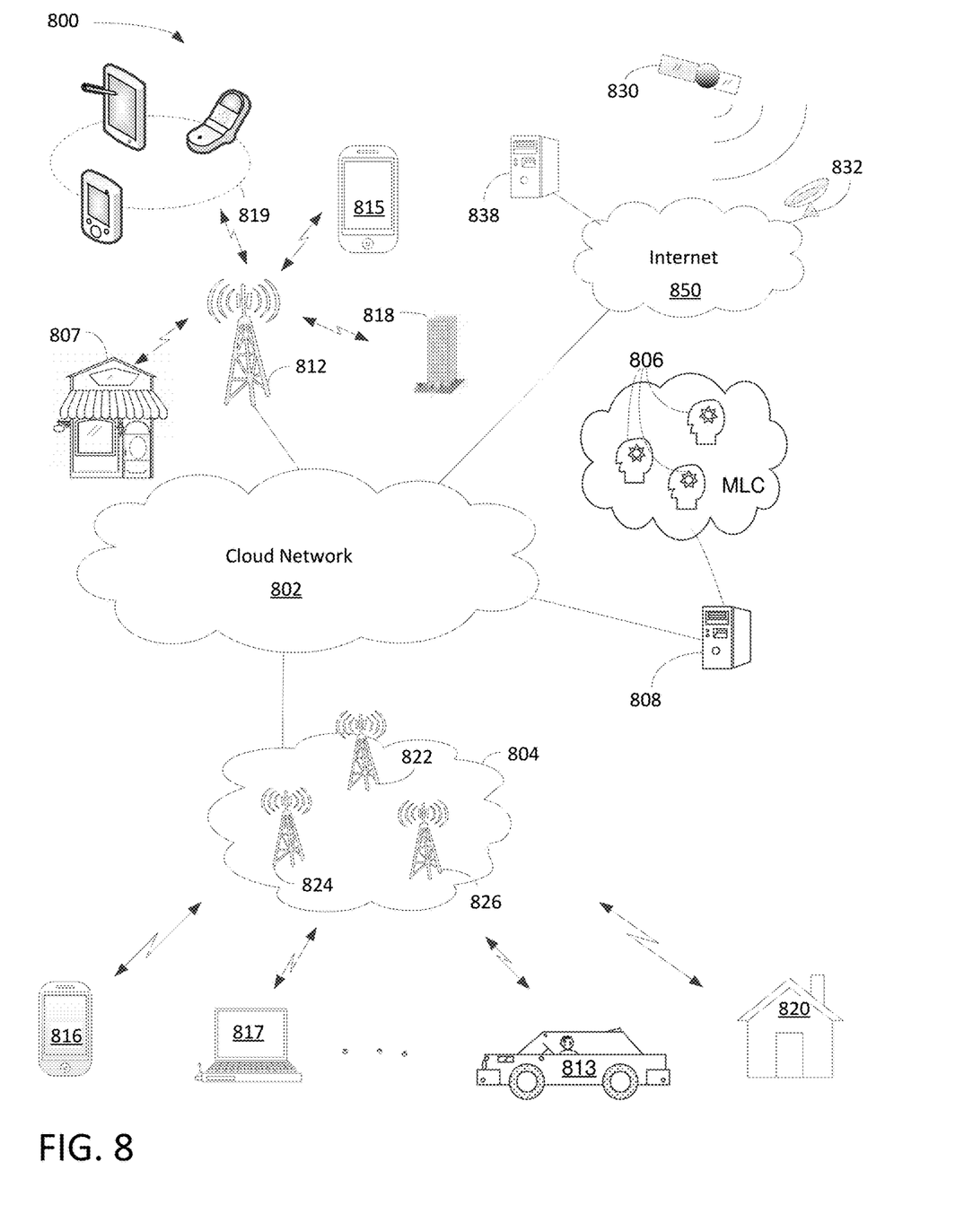
FIG. 8 is a block diagram illustrating various applications of HAS for facilitating online real-time conference call in accordance with one embodiment of the present invention.

FIG. 8 is a block diagram illustrating various applications of HAS for facilitating online real-time conference call in accordance with one embodiment of the present invention. Diagram 800 illustrates HAS server 808, communication network 802, switching network 804, Internet 850, and portable electric devices 813-819. In one aspect, real-time interactive video conference calls with HAS can be facilitated between various devices or attendees situated in various different geographic locations. Network or cloud network 802 can be wide area network, metropolitan area network ("MAN"), local area network ("LAN"), satellite/terrestrial network, or a combination of wide area network, MAN, and LAN. It should be noted that the underlying concept of the exemplary embodiment(s) of the present invention would not change if one or more blocks (or networks) were added to or removed from diagram 800.

Network 802 includes multiple network nodes, not shown in FIG. 8, wherein each node may include mobility management entity ("MME"), radio network controller ("RNC"), serving gateway ("S-GW"), packet data network gateway ("P-GW"), or Home Agent to provide various network functions. Network 802 is coupled to Internet 850, AI server 808, base station 812, and switching network 804. Server 808, in one embodiment, includes machine learning computers ("MLC") 806.

Switching network 804, which can be referred to as packet core network, includes cell sites 822-826 capable of providing radio access communication, such as 3G ($3^{rd}$ generation), 4G, or 5G cellular networks. Switching network 804, in one example, includes IP and/or Multiprotocol Label Switching ("MPLS") based network capable of operating at a layer of Open Systems Interconnection Basic Reference Model ("OSI model") for information transfer between clients and network servers. In one embodiment, switching network 804 is logically coupling multiple users and/or mobiles 816-820 across a geographic area via cellular and/or wireless networks. It should be noted that the geographic area may refer to a campus, city, metropolitan area, country, continent, or the like.

Base station 812, also known as cell site, node B, or eNodeB, includes a radio tower capable of coupling to various user equipments ("UEs") and/or electrical user equipments ("EUEs"). The term UEs and EUEs are referring to the similar portable devices and they can be used interchangeably. For example, UEs or PEDs can be cellular phone 815, laptop computer 817, iPhone® 816, tablets and/or iPad® 819 via wireless communications. Handheld device can also be a smartphone, such as iPhone®, BlackBerry®, Android®, and so on. Base station 812, in one example, facilitates network communication between mobile devices such as portable handheld device 813-819 via wired and wireless communications networks. It should be noted that base station 812 may include additional radio towers as well as other land switching circuitry.

Internet 850 is a computing network using Transmission Control Protocol/Internet Protocol ("TCP/IP") to provide linkage between geographically separated devices for communication. Internet 850, in one example, couples to supplier server 838 and satellite network 830 via satellite receiver 832. Satellite network 830, in one example, can provide many functions as wireless communication as well as global positioning system ("GPS"). It should be noted that HAS can be applied a lot of fields, such as, but not limited to, smartphones 813-819, satellite network 830, automobiles 813, AI server 808, business 807, and homes 820.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 9:
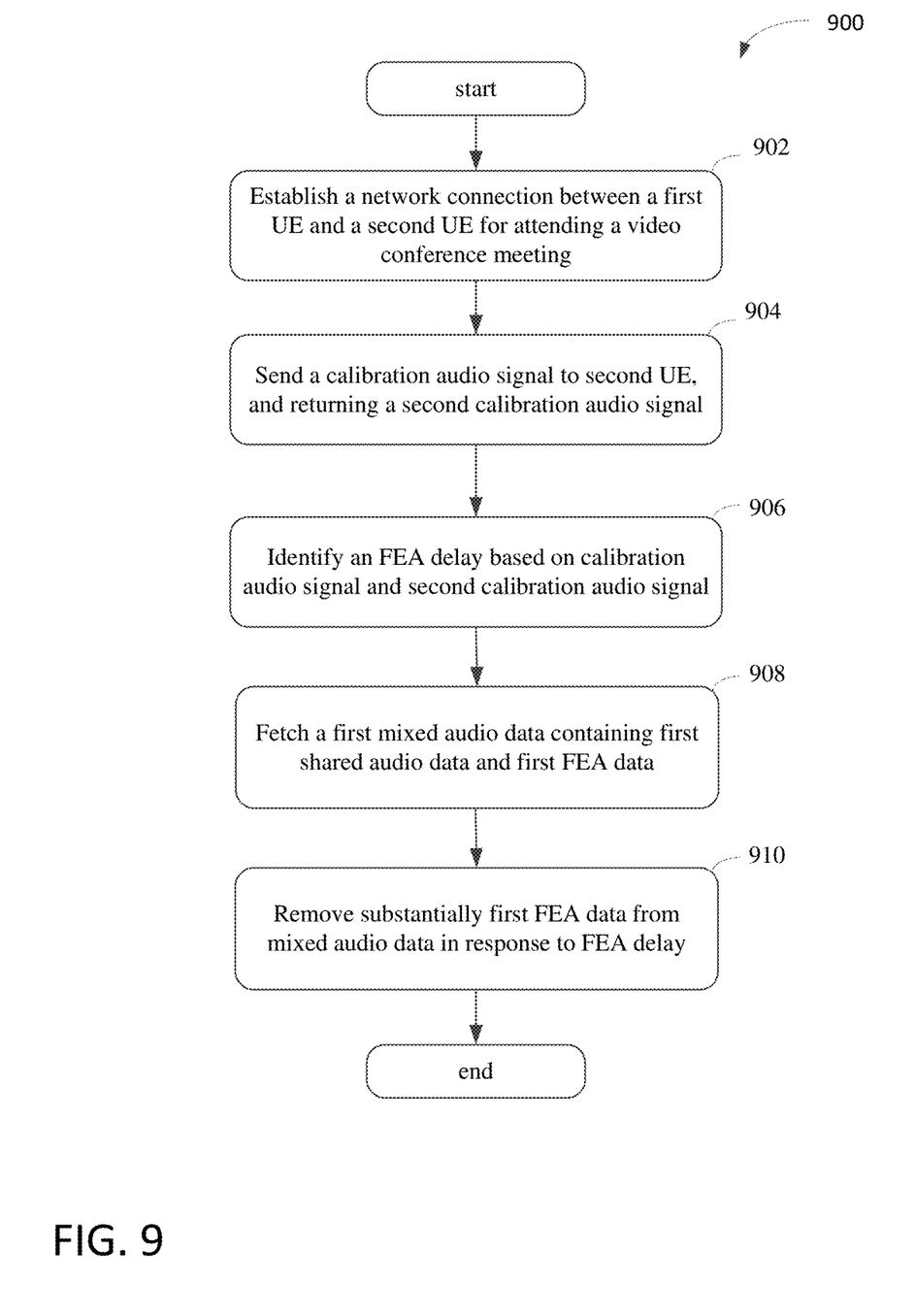
FIG. 9 is a flowchart illustrating a process of implementation of HAS operation in accordance with one embodiment of the present invention.

FIG. 9 is a flowchart 900 illustrating a process of implementation of HAS operation in accordance with one embodiment of the present invention. At block 902, a process of HAS operation for facilitating a real-time video conference with enhanced audio quality is capable of establishing a network connection between a first UE and a second UE via a communication network for attending a video conference meeting. For example, multiple systems and/or portable devices situated in different geographical locations are linked via a communications network for a real-time interactive video conference.

At block 904, upon sending a first calibration audio signal from the first UE to the second UE, a second calibration audio signal is returned from the second UE to the first UE in accordance with the first calibration audio.

At block 906, an FEA delay is identified based on the first calibration audio signal and the second calibration audio signal.

At block 908, a first mixed audio data containing first shared audio data and first FEA data is fetched a first location of an audio buffer.

At block 910, the process is able to remove substantially the first FEA data from the mixed audio data in response to the FEA delay. In one example, an acoustic echo cancellation module is activated to extract the first FEA data from the mixed audio data.

In one aspect, the process is capable of fetching the first FEA from an FEA buffer which stores information from the second UE. Alternatively, input FEA information is obtained from the second UE and generating FEA data based on the input FEA information. The process is also able to push FEA data into an FEA buffer in accordance with the first FEA delay. For example, FEA data is pushed or stored into one of many storage locations in the FEA buffer based on the FEA delay. In one embodiment, the process is capable of obtaining an incoming FEA signal from the second UE via the communication network and forwarding the incoming FEA to a time domain modifier to generate a first modified FEA signal containing information relating to attenuation. Upon generating a minimal value of sum-of-absolute-difference in response to the first modified FEA signal, the first modified FEA signal is forwarded to a frequency domain modifier to generate a second modified FEA signal in response to the minimal value. The second modified FEA signal is subsequently stored into a buffer location pointed by the FEA delay.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for facilitating a real-time video conference with enhanced audio quality via client devices and a communication network, the method comprising:
   establishing a network connection between a first user equipment ("UE") and a second UE via a communication network for attending a video conference meeting;

sending a first calibration audio signal from the first UE to the second UE, and returning a second calibration audio signal from the second UE to the first UE in accordance with the first calibration audio signal;

identifying a first far end audio ("FEA") delay based on the first calibration audio signal and the second calibration audio signal;

fetching a first mixed audio data containing first shared audio data and first FEA data from a first location of an audio buffer; and removing the first FEA data from the mixed audio data in response to the first FEA delay.

2. The method of claim 1, further comprising fetching the first FEA data from an FEA buffer which stores information from the second UE.

3. The method of claim 1, further comprising obtaining input FEA information from the second UE and generating FEA data based on the input FEA information.

4. The method of claim 3, further comprising pushing FEA data into an FEA buffer in accordance with the first FEA delay.

5. The method of claim 3, further comprising pushing FEA data into one of a plurality of storage locations in an FEA buffer based on the first FEA delay.

6. The method of claim 1, further comprising:
obtaining an incoming FEA signal from the second UE via the communication network; and
forwarding the incoming FEA to a time domain modifier to generate a first modified FEA signal containing information relating to attenuation.

7. The method of claim 6, further comprising generating a minimal value of sum-of-absolute-difference in response to the first modified FEA signal.

8. The method of claim 7, further comprising forwarding the first modified FEA signal to a frequency domain modifier to generate a second modified FEA signal in response to the minimal value.

9. The method of claim 8, further comprising storing the second modified FEA signal into a buffer location pointed by the first FEA delay.

10. The method of claim 1, wherein establishing a network connection between a first user equipment ("UE") and a second UE includes linking a plurality of systems and portable devices situated a plurality of geographically different physical locations for a real-time interactive video conference.

11. The method of claim 1, wherein removing substantially the first FEA data from the mixed audio data includes activating an acoustic echo cancellation module to extract the first FEA data from the mixed audio data.

12. A real-time conference meeting linking a plurality of systems for providing an interactive video conference via a network comprising the method of claim 1.

13. A method for facilitating an interactive video conference via a plurality of client devices coupled with a communication network, the method comprising:
establishing a conference meeting linking a first user equipment ("UE") to a second UE via a communication network for attending the conference meeting;
obtaining a first far end audio ("FEA") signal from the second UE to the first UE via the communication network;
forwarding the first FEA to a time domain modifier to generate a first modified FEA signal containing information relating to attenuation;
generating a minimal value of sum-of-absolute-difference in response to the first modified FEA signal; and
obtaining and storing a second modified FEA signal into a buffer location pointed by a first FEA delay.

14. The method of claim 13, further comprising forwarding the first modified FEA signal to a frequency domain modifier to generate a second modified FEA signal when the minimal value is greater than a predefined minimal number.

15. The method of claim 13, further comprising:
sending a first calibration audio signal from the first UE to the second UE; and
returning a second calibration audio signal from the second UE to the first UE in accordance with the first calibration audio.

16. The method of claim 15, further comprising identifying the FEA delay based on the first calibration audio signal and the second calibration audio signal.

17. The method of claim 16, further comprising fetching a first mixed audio data containing first shared audio data and first FEA data from a first location of an audio buffer and removing the first FEA data from the mixed audio data in response to the first FEA delay.

18. An apparatus for facilitating an interactive video conference coupling to a plurality of attendees via a plurality of client devices comprising:
a far end audio ("FEA") delay module coupling to a plurality of user devices ("UDs") configured to identify an FEA delay based on an audio calibration process;
a mixer module coupled to the FEA delay module and configured to generate audio data by mixing shared audio data and FEA data;
an FEA remover module coupled to the mixer module and configured to identify the FEA data in accordance with the FEA delay and generate shared audio data via subtracting the FEA data from the audio data; and
a time domain module coupled to the FEA remover module and configured to generate a modified FEA data reflecting information relating to attenuation and store the modified FEA data in an FEA buffer.

19. The apparatus of claim 18, further comprising a frequency domain module coupled to the FEA remover module and configured to generate a modified FEA data reflecting information relating to attenuation and store the modified FEA data in an FEA buffer.

20. An apparatus for facilitating an interactive video conference coupling to a plurality of attendees via a plurality of client devices comprising:
a far end audio ("FEA") delay module coupling to a plurality of user devices ("UDs") configured to identify an FEA delay based on an audio calibration process;
a mixer module coupled to the FEA delay module and configured to generate audio data by mixing shared audio data and FEA data;
an FEA remover module coupled to the mixer module and configured to identify the FEA data in accordance with the FEA delay and generate shared audio data via subtracting the FEA data from the audio data; and
a frequency domain module coupled to the FEA remover module and configured to generate a modified FEA data reflecting information relating to attenuation and store the modified FEA data in an FEA buffer.

21. The apparatus of claim 20, further comprising a time domain module coupled to the FEA remover module and configured to generate a modified FEA data reflecting information relating to attenuation and store the modified FEA data in an FEA buffer.

* * * * *